Nov. 2, 1965   A. W. JACOBS   3,214,920

TORPEDO

Filed Sept. 6, 1962

INVENTOR.
ARTHUR W. JACOBS
BY
ATTORNEYS

United States Patent Office 3,214,920
Patented Nov. 2, 1965

3,214,920
TORPEDO
Arthur W. Jacobs, 5994 Columbia Road,
North Olmsted, Ohio
Filed Sept. 6, 1962, Ser. No. 221,805
2 Claims. (Cl. 61—72.1)

This invention relates generally, as indicated, to a torpedo and more particularly to a tractor or like power driven implement for installing lawn sprinkler systems with minimum damage to the lawn turf.

As seen in the United States patent to Lilly 996,866, attempts have been made to employ a blade mounted torpedo to form a hole underground for pulling pipe through such hole. However, I have found that varying soil conditions such as clay, rock and other materials often encountered beneath lawn turf create such a resistance as to require a tremendous tractor or other type vehicle for pulling properly the torpedo through the ground. Large tractors, of course, destroy the grass upon which they must be driven and if the tractor wheels spin as the result of resistance encountered, it is, of course, apparent that these spinning wheels do not improve the beauty of the lawn. Lawns, of course, are often damp or wet and such further increases the tendency of tractors to lose traction and the wheels thereof to spin seriously damaging the lawn.

With the present invention, I have discovered that the hoses or pipes being pulled through the ground can be used as a source of supplying the torpedo with a water lubricant so that it will much more readily pass through the turf.

It is accordingly a principal object of the present invention to provide a blade mounted torpedo for installing underground pipe or hose having a water lubricated tip.

A further principal object is the provision of a torpedo implement which can be employed readily to pull flexible plastic hose through the turf beneath a lawn without undue damage to such lawn.

Another object is the provision of a two-piece torpedo implement for installing underground pipe or hose wherein the junction of such pieces provides a water distribution system for lubricating the exterior thereof.

Still another object of the present invention is the provision of a tractor mounted implement which will facilitate and expedite the installation of underground sprinkler systems.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
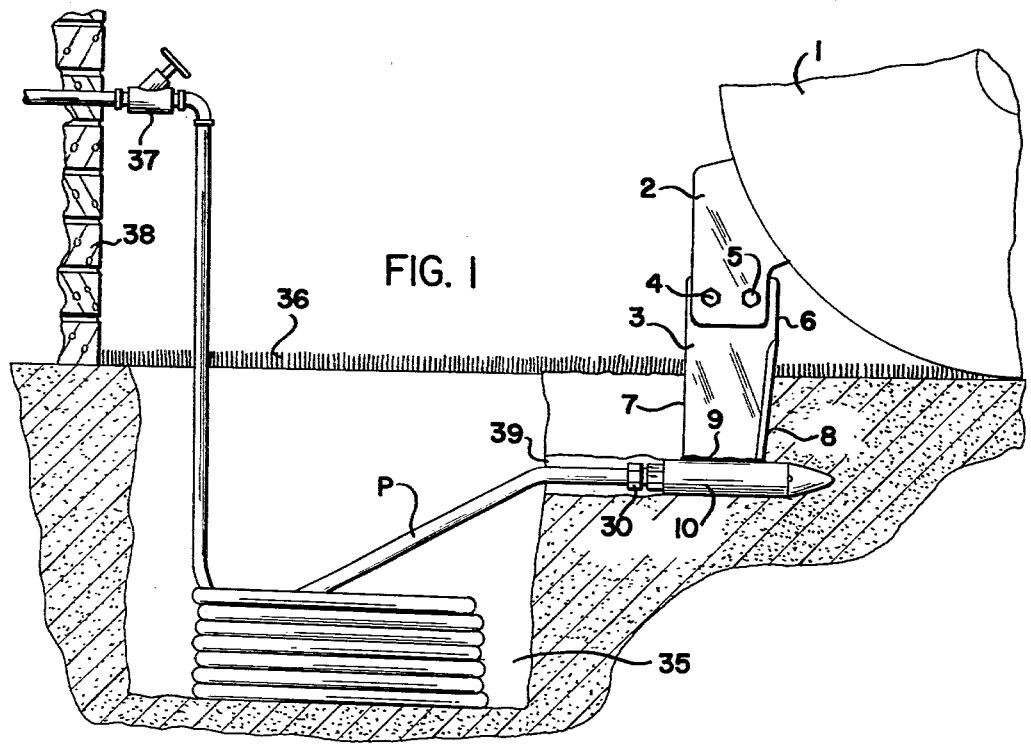
FIG. 1 is a fragmentary vertical section illustrating the present invention in use.

Referring now to the annexed drawing and more particularly to FIG. 1, there is shown the wheel 1 of a tractor or the like vehicle provided with a hitch 2 which can be pivoted about a horizontal axis from a traveling position to the working position shown. To such hitch is attached the torpedo implement of the present invention which comprises a blade 3 provided with two top apertures through which suitable fasteners 4 and 5 may be employed firmly to secure such blade to the hitch 2. Such blade has an upper leading edge 6 parallel to the rear edge 7 which merges into an inclined leading knife edge 8 which slopes rearwardly and continues for approximately two-thirds the height of the blade to the bottom thereof. The blade is thus narrower at the bottom than the top. The bottom of the blade may be secured as by the welding indicated at 9 to the body 10 of the torpedo. Such body 10 is generally cylindrical and may, for example, be 1¼ inches in diameter when employed to insert flexible plastic pipe P of approximately ¾ inch size. The leading surface of the body 10 may be slightly rounded as indicated at 11 to provide a streamlined outer surface.

Figure 2:
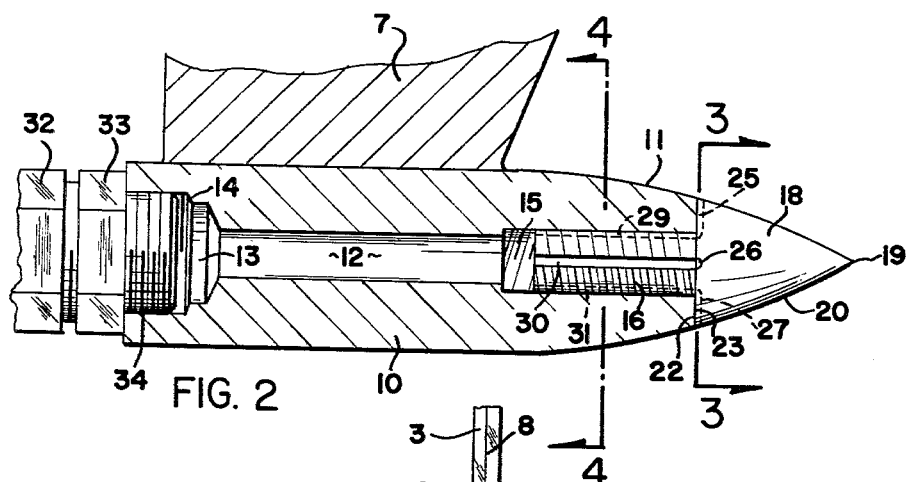
FIG. 2 is an enlarged longitudinal section of the torpedo shown in FIG. 1.
Figure 3:
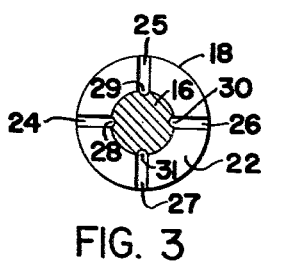
FIG. 3 is a transverse section of the tip of the torpedo taken substantially on the line 3—3 of FIG. 2.
Figure 4:
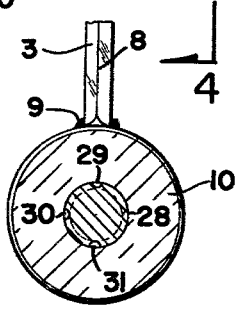
FIG. 4 is a transverse section of such torpedo taken substantially on the line 4—4 of FIG. 2.

As seen in FIG. 2, the torpedo body 10 is provided with a central longitudinally extending bore 12 provided with a first rearward enlargement 13 and a further internally tapped enlargement 14. The leading end of the bore is also enlarged and internally tapped as indicated at 15. Into such leading internally tapped enlargement 15 there is secured the threaded shank 16 of the tip or nose piece 18 of such torpedo. The nose piece is pointed as shown at 19 and is provided with an external surface 20 which presents a continuation of the streamlined rounded surface 11 of the leading end of the body 10. In the illustrated embodiment, the maximum diameter of the nose piece may be approximately 1 inch at its surface juncture with the leading end of the body 10. Accordingly, the leading end of the body 10 will be approximately ¼ inch more narrow than the maximum diameter thereof. The diameter of the bore 12 may, for example, be ⅜ of an inch and the enlargement 15 approximately ½ inch in diameter. The longitudinal extent of the enlargement 15 may be approximately 1½ inches and the longitudinal extent of the threaded shank 16 of the nose piece may be 1¼ inches. The nose angle of the tip of the nose piece may be approximately 45° although sharper or more blunt nose angles may be employed.

In the illustrated embodiment, the rear face or shoulder 22 of the nose piece which abuts flush against the leading face 23 of the body 10 is provided with four radially extending hemispherical grooves 24, 25, 26 and 27 which are continuations of longitudinally extending hemispherical grooves 28, 29, 30 and 31 in the shank portion 16 of the nose piece 18. Such grooves then provide fluid communication between the central bore 12 and the exterior surface of the torpedo adjacent the section line 3—3 as seen in FIG. 2 with such fluid issuing through the four hemispherical apertures provided in the outer curved surface of the torpedo at the juncture of the nose piece and body.

The end of the flexible pipe or hose P may be provided with a gland-type coupling 32 which includes a coupling body 33 provided with an externally threaded shank 34 which may then threadedly be secured into the internally tapped recess 14. In this manner, the length of flexible hose or pipe P is then firmly secured to the rear of the torpedo to be pulled through the ground to the desired springler outlet location, for example. Reference may be had to my copending application, Serial No. 65,330 filed Oct. 7, 1906, entitled Gland Type Coupling for Tubes for a disclosure of a suitable coupling that may be employed with the present invention.

Referring now to FIG. 1, in the installation of underground lawn sprinkler systems, a hole or recess 35 in the ground is provided for a valved manifold or outlet distributor and underground pipes radiating from such hole are provided leading to the various sprinkler outlets. For a more clear disclosure of such underground sprinkler arrangement, reference may be had to my copending application, Serial No. 221,806, entitled Automatic Sprinkler Control System and Components Thereof. The pipe or hose P may be coiled or stored in a convenient location such as within the hole 35 or there adjacent on the grass 36. One end of the pipe is connected to a spigot outlet 37 which may extend from a house wall 38 and the other end of the pipe is connected to the rear of the torpedo body 10. Commencing in the hole 35, the torpedo is then driven through the ground by the tractor pulling the pipe through the hole 39 created by the torpedo. The spigot 37 is turned on and water is then forced through the pipe P and into the torpedo to flow through the bore 12 and through the longitudinally extending grooves 28 through 31 and then radially outwardly through the grooves 24 through 27. In this manner, the external surface of the torpedo is provided with water lubrication so that it will more readily pass through the ground. Such water lubrication is provided along the streamlined surface of the torpedo spaced considerably from the point 19 and yet well ahead of the maximum diameter section. This area has been found to create the greatest frictional resistance and with such water lubrication, little or no resistance is encountered such that tractor wheels 1 would spin on a damp surface damaging the lawn. When the point in the lawn has been reached for the outlet, the water is turned off at the spigot 37 and the torpedo is removed and the sprinkler outlet installed with little or no damage to the grass 36. The knife edge 8 will readily pass through the grass requiring little or no turf replacement. Another inherent advantage in the present construction is that the lawn will be simultaneously watered when disturbed and any displaced lawn root structures will not be permitted to dry out destroying a portion of such lawn.

It can now be seen that there is provided a water lubricated torpedo which will utilize the pipe or hose being drawn through the hole thus formed to provide surface water lubrication for the nose of the torpedo permitting it readily to pass through all types of soil resistance.

Other modes of applying the principle of the invention may be employed, change being made as regards the details described, provided the features stated in any of the following claims or the equivalent of such be employed.

I, therefore, particularly point out and distinctly claim as my invention:

1. A torpedo for installing underground fluid sprinkling systems and the like in a lawn comprising a vertically extending blade having a leading knife edge adapted to cut through such lawn, an elongated cylindrical body extending horizontally and secured to the bottom of said blade, a longitudinally extending fluid passage in said body, said passage terminating in a leading enlarged internally threaded recess adjacent the leading end thereof, a removable nose piece having an elongated threaded shank fitted in said internally threaded recess in said body, external longitudinally extending grooves running the entire length of said shank and terminating in radially outwardly extending grooves in said nose piece, said longitudinally and radially extending grooves being in fluid communication with said longitudinally extending fluid passage in said body, said radially extending grooves extending to the exterior surface of said torpedo, and means provided on said body for securing an elongated fluid pipe or the like thereto in fluid communication with said fluid passage, whereby water may be forced through said pipe, through said torpedo body, and outwardly through the passages in said nose piece to lubricate said torpedo as it is driven through the ground.

2. A torpedo comprising a solid body portion, a longitudinally extending fluid passageway in said body portion, said fluid passageway having an enlarged leading end, a removable solid nose piece having an elongated shank fitted in said enlarged leading end and secured to said body portion with the rear face of said nose piece abutting flush against the leading face of said body portion, said elongated shank having external longitudinally extending grooves in fluid communication with said longitudinally extending fluid passageway in said body portion, and said rear face of said nose piece having radially extending grooves in fluid communication with said external grooves in said shank, said radially extending grooves extending to the exterior surface of said torpedo.

References Cited by the Examiner
UNITED STATES PATENTS

| | | | |
|---|---|---|---|
| 95,878 | 10/69 | Brummel | 175—21 |
| 862,972 | 8/07 | Jones | 175—62 |
| 996,886 | 7/11 | Lilly | 61—72.2 |
| 1,808,974 | 6/31 | Wilkens | 61—72.7 |
| 2,673,453 | 3/54 | Templeton | 61—53.74 |
| 2,680,416 | 6/54 | Russell | 61—11 |

FOREIGN PATENTS

| | | |
|---|---|---|
| 124,820 | 4/19 | Great Britain. |
| 1,126,023 | 11/56 | France. |

EARL J. WITMER, *Primary Examiner.*